US011423573B2

(12) United States Patent
Yuan et al.

(10) Patent No.: US 11,423,573 B2
(45) Date of Patent: Aug. 23, 2022

(54) SYSTEM AND METHODS FOR CALIBRATING CAMERAS WITH A FIXED FOCAL POINT

(71) Applicant: UATC, LLC, San Francisco, CA (US)

(72) Inventors: Zhijia Yuan, Bethel Park, PA (US); Randyll Mark Cash, II, Pittsburgh, PA (US); Danny Hongyu Lu, Lexington, MA (US); David Golladay, Pittsburgh, PA (US); Michael Vinent Praskovich, Pittsburgh, PA (US); Benjamin David Himes, Dayton, PA (US); Armen Berberian, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 198 days.

(21) Appl. No.: 16/854,486

(22) Filed: Apr. 21, 2020

(65) Prior Publication Data
US 2021/0225033 A1    Jul. 22, 2021

Related U.S. Application Data

(60) Provisional application No. 62/964,396, filed on Jan. 22, 2020.

(51) Int. Cl.
*G06K 9/00* (2022.01)
*G06T 7/80* (2017.01)
*G06T 7/571* (2017.01)

(52) U.S. Cl.
CPC ............... *G06T 7/80* (2017.01); *G06T 7/571* (2017.01); *G06T 2207/30208* (2013.01); *G06T 2207/30252* (2013.01)

(58) Field of Classification Search
CPC combination set(s) only.
See application file for complete search history.

(56) References Cited

U.S. PATENT DOCUMENTS 6,125,197 A * 9/2000 Mack ..................... G06T 7/521
382/154
8,108,119 B2 * 1/2012 Southall .................... B60T 7/22
701/96

(Continued)

FOREIGN PATENT DOCUMENTS

WO    WO 2009/142921    11/2009

OTHER PUBLICATIONS

International Search Report and Written Opinion for Application No. PCT/US2021/0124325, dated Apr. 15, 2021, 13 pages.

*Primary Examiner* — Shervin K Nakhjavan
(74) *Attorney, Agent, or Firm* — Dority & Manning, P.A.

(57) ABSTRACT

The present disclosure is directed to a system for calibrating cameras with a fixed focal point. In particular, a camera calibration system comprising one or more computing devices can project a plurality of fiducial markers on a target surface using the plurality of collimators. The camera calibration system can capture, using the camera, a plurality of images of the target surface with the camera, wherein the camera is rotated between each captured image in the plurality of images. The camera calibration system can compare the plurality of images with a ground truth projection. The camera calibration system can generate calibration data based on the comparison of the plurality of images with the ground truth projection. The camera calibration system can store the calibration data for use in rectifying the camera.

20 Claims, 12 Drawing Sheets

(56) References Cited

U.S. PATENT DOCUMENTS

| | | | |
|---|---|---|---|
| 8,866,904 B2* | 10/2014 | Inui | G06T 7/80 |
| | | | 348/148 |
| 9,201,424 B1 | 12/2015 | Ogale | |
| 9,338,447 B1 | 5/2016 | Crump et al. | |
| 2003/0038933 A1* | 2/2003 | Shirley | G01B 11/25 |
| | | | 356/243.1 |
| 2003/0231175 A1* | 12/2003 | Pfister | G06T 15/205 |
| | | | 345/419 |
| 2007/0291184 A1* | 12/2007 | Harville | G06T 3/005 |
| | | | 348/745 |
| 2010/0321490 A1* | 12/2010 | Chen | G01C 21/32 |
| | | | 348/118 |
| 2012/0022739 A1* | 1/2012 | Zeng | B60W 30/165 |
| | | | 701/536 |
| 2013/0053702 A1* | 2/2013 | Pfeiffer | A61B 5/0064 |
| | | | 600/476 |
| 2014/0212000 A1* | 7/2014 | Yagcioglu | G06K 9/00362 |
| | | | 382/103 |
| 2015/0142248 A1* | 5/2015 | Han | G01C 21/3602 |
| | | | 701/23 |
| 2015/0288951 A1* | 10/2015 | Mallet | H04N 17/002 |
| | | | 348/46 |
| 2017/0032526 A1* | 2/2017 | Gao | B60R 11/04 |
| 2017/0359573 A1 | 12/2017 | Kim et al. | |
| 2018/0276463 A1* | 9/2018 | Pritz | G06K 9/00771 |
| 2019/0302879 A1* | 10/2019 | Schwarz | G06F 3/0414 |
| 2020/0191927 A1* | 6/2020 | Lin | G01S 17/931 |

* cited by examiner

SYSTEM AND METHODS FOR CALIBRATING CAMERAS WITH A FIXED FOCAL POINT

RELATED APPLICATION

This application claims priority to and the benefit of U.S. Provisional Patent Application No. 62/964,396, filed Jan. 22, 2020, which is hereby incorporated by reference in its entirety.

FIELD

The present disclosure relates generally to sensors. More particularly, the present disclosure relates to improving the calibration of cameras.

BACKGROUND

An autonomous vehicle is a vehicle that is capable of sensing its environment and navigating without human input. In particular, an autonomous vehicle includes a plurality of sensors, including cameras, that are used to observe its surrounding environment. However, each sensor must be calibrated to ensure it is accurately providing information describing the surrounding environment. More specifically, calibrating a camera with a fixed focal point is an important part of preparing an autonomous vehicle to navigate through its surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include projecting a plurality of fiducial markers on a target surface using the plurality of collimators. The method can include capturing, using the camera, a plurality of images of the target surface with the camera, wherein the camera is rotated between each captured image in the plurality of images. The method can include comparing the plurality of images with a ground truth projection. The method can include generating calibration data based on the comparison of the plurality of images with the ground truth projection. The method can include rectifying the camera based on the calibration data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
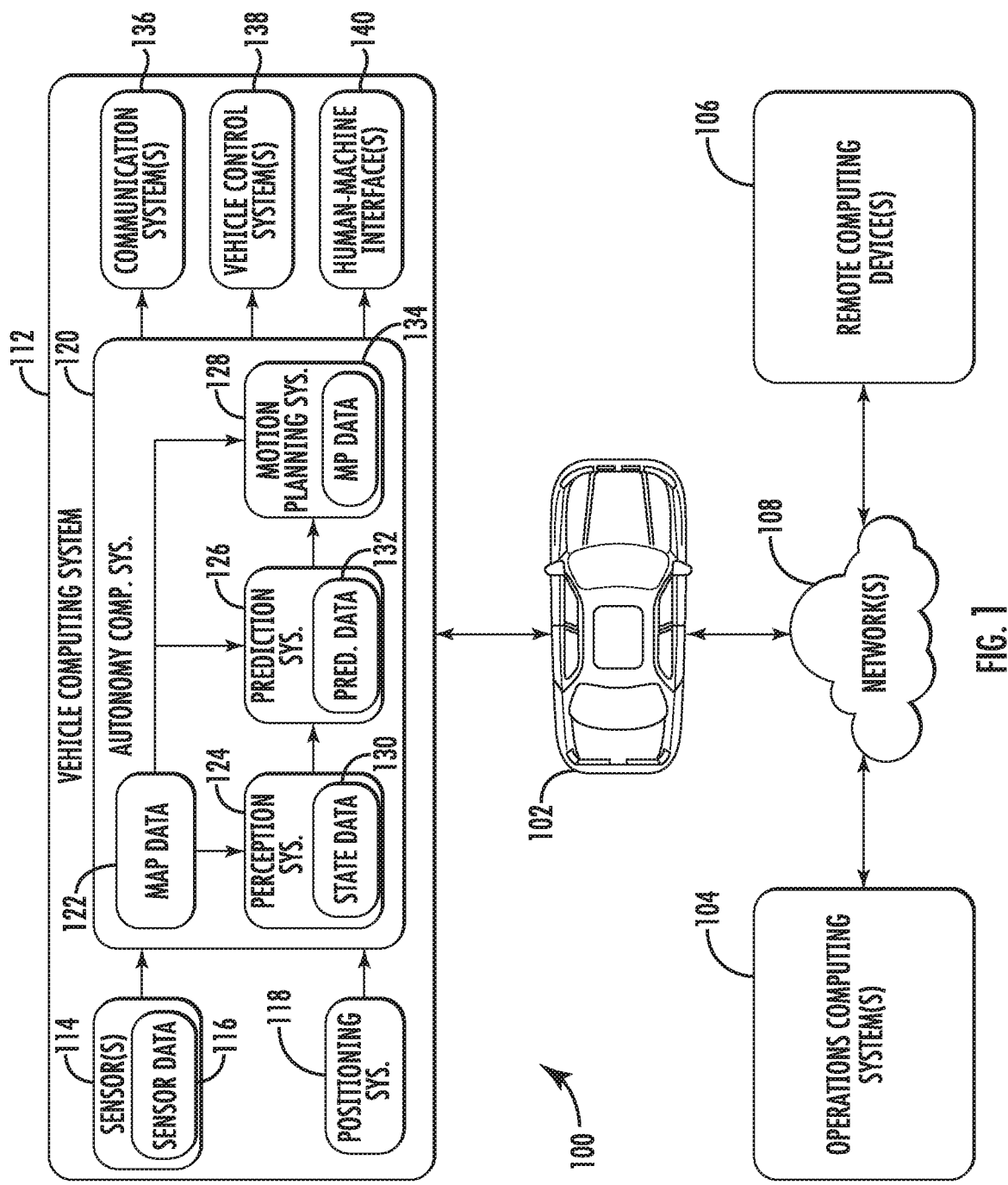
FIG. 1 an example system for controlling the navigation of a vehicle according to example embodiments of the present disclosure.

Generally, the present disclosure is directed to a system for intrinsically calibrating a camera with a fixed focal point. For example, during the manufacturing process for some cameras, one of the final steps involves measuring the distortions of a given camera when capturing an image of a known fiducial marker (e.g., a projected marker included in a projected object or image). However, when a particular camera has a fixed focus that is far away from the camera, a large calibration area may be needed to capture images of the projected fiducial markers which are sufficiently in focus for measuring the distortions of that particular camera. To overcome this issue, the system described in the current application allows a camera to be calibrated without the need for a large calibration area. Specifically, the disclosed camera testing system includes a plurality of collimators. Collimators can project fiducial markers (e.g., specific images designed to have one or more discoverable points) such that the rays of light that make up the projected fiducial markers are projected such that the system can control the focal distance of the markers (e.g., the apparent distance from fiducial targets to the camera being tested). For example, the collimators can project the rays of light in parallel to make the target appear infinitely far away.

The camera testing system can generate a ground truth projection for use in calibrating the camera. The camera testing system can determine the current angles for each collimator in the plurality of collimators. In some cases, the current angles for each collimator can be difficult to determine without first calibrating the camera testing system.

The camera testing system can mathematically project the location that each fiducial marker will be projected onto a virtual surface (e.g., a surface with characteristics that match the actual surface upon which fiducial markers are to be projected). The mathematical projection can be used to create a ground truth projection with a plurality of fiducial marker positions. Once the ground truth projection has been generated, the camera testing system can use the collimators to project a plurality of fiducial markers (potentially with target points embedded in the fiducial markers) onto a target surface. In some examples, the projection of the fiducial markers and generation of the ground truth projection can occur concurrently, simultaneously, or near simultaneously.

The camera testing system can cause the camera being tested to capture a plurality of images of the target surface. Because the fiducial markers have been projected such that they simulate objects that are at a very far distance, a camera with a very far (or infinite) fixed focal point can capture acceptably in-focus images of the fiducial markers without the fiducial markers having to be projected or printed onto a surface that is significantly far away. It should be noted that different embodiments can encompass calibrating cameras with different focal lengths by altering the apparent distance at which the fiducial markers are projected. In addition, the disclosed system can be used to calibrate sensors that capture electromagnetic waves outside the visible spectrum (e.g., infrared sensors and so on).

Once a plurality of images have been captured, the images can be analyzed to identify one or more points for each fiducial marker. For example, each marker in the plurality of fiducial markers can have one or more discoverable target points (e.g., a central point). Once the camera testing system has determined a plurality of target points for a plurality of fiducial markers, the plurality of target points can be used to generate a reference grid. The reference grid represents the data captured by the camera and thus reflects any distortions introduced to the camera images by the lens system. The generated reference grid can be compared to a ground truth projection which represents the positions of the fiducial markers (and corresponding target points) if no distortions were introduced by the lens system of the camera.

In some examples, the comparison between the captured reference grid and the ground truth projection can be used to generate intrinsic calibration data. Intrinsic calibration data can include data that describes how and in which ways the image captured by the camera is distorted. Using calibration data, the camera testing system can initialize or update calibration values on the camera. The calibration values can be data that the camera uses to correct images it captures such that they are more accurate and have fewer distortions.

More specifically, the camera testing system can allow manufacturers to calibrate cameras with a fixed focal point more efficiently and with less space needed. In the realm of autonomous vehicles, which use multiple cameras, some of which are focused far in the distance, improving the process of calibrating cameras with a far focal distance can improve the reliability and effectiveness of those autonomous vehicles, while also reducing the cost to calibrate those cameras.

A camera testing system can include a camera testing device. The camera testing device can include a plurality of collimators, a camera mount, and a chassis that supports the camera mount and the collimators while allowing rotation of the camera mount and adjustment of the angles of the collimators. In some examples, the collimators are configured such that the angle at which they project images onto a target surface can be adjusted by a control system associated with the camera testing device. In other examples, the angles associated with the collimators can be fixed. In some examples, the camera testing device can include seven collimators.

The camera testing system includes a camera mount for holding the camera to be tested. The camera mount is configured such that the camera can be rotated around its entrance pupil. In this way, when the camera is rotated, the input position remains constant.

The camera testing system can include a control system. The control system can include one or more processors and memory. The memory can store instructions that, when executed by one or more computing devices, cause the control system to perform operations. For example, the control system can determine (via mathematical projection) an expected ground truth projection. By using gnomonic projection to calculate the expected position of the fiducial markers on a virtual plane, the camera testing system can use the ground truth projection to determine whether specific cameras (e.g., the lens systems within the cameras) are distorting image data captured from the target surface.

In some examples, the control system can use the position and orientation of each collimator to calculate the ground truth projection which represents the place on the target surface that the fiducial markers will be projected. In other examples, the control system can access a previously determined ground truth projection and adjust the angles of the collimators based on the previously determined desired ground truth projection.

The control system can also control the camera to be tested. Specifically, the control system can determine how many images are captured and how quickly the camera is rotated between each image. The control system can cause the collimators to begin projecting a plurality of fiducial markers. The fiducial markers can be projected onto a target surface such that they contain one or more discoverable points (e.g., target points). In some examples, the target surface can be a surface associated with the camera testing system, such as a screen for projections attached to the camera testing system at a fixed distance from the camera. In some examples, the target surface is a permanent feature of the space such as a wall.

In some examples, the markers are projected onto the target surface by the collimators such that they simulate an object or image at an infinite distance. This can be accomplished by the collimators, which modify the projected light rays such that the projected light rays travel on paths that are parallel to each other. Parallel light rays, when reflected back to a camera off of the target surface, can simulate an object at infinite distance. In some examples, the camera can have a fixed focal point that is focused on infinity. Thus, when the camera captures the projected fiducial markers (which have been projected with parallel light rays), the camera which is being tested can focus clearly enough to distinguish the necessary features of the projected fiducial marker and identify the position of the one or more discoverable points within the fiducial marker.

Once the camera has captured a plurality of images of the target surface, the control system can compare the captured image data to the ground truth projection. Once the captured image data is compared to the ground truth projection, the control system can generate calibration data. In some examples, calibration data can represent data measuring distortions present between the captured image data and the ground truth projection. In some examples, the calibration data also represents data that the camera can use to adjust image data captured by the camera to remove the identified distortions in future captured images.

As noted above, the collimator can be used to project markers at infinity (e.g., the markers simulate an image or marker at an infinite distance). To achieve this task, the collimator can include a light source, an aperture, and a positive lens. A positive lens is a lens that is thicker at its center and thinner towards its outer portions. Thus, the light source projects light through the lens which then passes through the aperture. The light source can also either modify or originate light such that the fiducial marker is projected.

As noted above, the collimator can act to change the path of light rays passing through the positive lens such that the rays of light, which originate from a light source having a path that diverges (spreads out from each other), can be altered by the positive lens in the collimator such that the path of the light rays become parallel to each other. In this way, the collimator can simulate an object at infinite distance.

In some examples, the fiducial marker can include one or more discoverable points. For example, the fiducial marker can be an image that has a center that is discoverable by the camera testing system. In this particular example, the fiducial marker can be a circular target that is composed of two colors arranged such that the center can be determined by analyzing one or more captured images. In some examples, the fiducial markers can include any other pattern that can be analyzed to determine one or more reference points.

In some examples, the camera testing system can project a series of fiducial markers on the target surface such that they form a pattern. As noted above, the pattern can be based on a ground truth projection (which was generated by mathematically projecting images onto a virtual plane based on collimator angle data). In a particular example, the pattern is a series of fiducial markers arranged in 7 rows and 9 columns.

In some examples, a ground truth projection can be calculated to represent the expected arrangement of the fiducial markers on the target surface. The camera testing system can calculate the correct angles for the plurality of collimators based on the ground truth projection as well as any information about the target surface. Relevant data about the target surface can include the distance of the target surface, the angle of the target surface relative to the collimators and the camera, and the composition of the target surface.

The degree to which the gnomonic projection of the fiducial markers accurately represents the actual projection depends, at least in part, on the accuracy of the estimated angles for the collimators. Another contributing factor that can contribute to the degree to which reprojection error is minimized is the accuracy of the rotation stage encoder. Reprojection error can be geometric error corresponding to the image distance between a projected fiducial marker and a measured one if the measuring lens system did not distort the captured image at all. Thus, the greater the precision with which the position of the camera (based on information about the movements of the rotation stage encoder) can be known, the smaller the degree to which reprojection error can affect the ability of the camera testing system to calibrate itself and to calibrate cameras.

In some examples, the positions for fiducial markers on the ground truth projection can be generated using gnomonic projection of the fiducial markers onto a virtual surface based on the angles associated with the plurality of collimators. These positions can be calculated using the following equations:

$$\cos c = \sin\phi_0 \sin\phi + \cos\phi_0 \cos\phi \cos(\lambda - \lambda_0)$$

$$x = \frac{\cos\phi \sin(\lambda - \lambda_0)}{\cos c}$$

$$y = \frac{\cos\phi_0 \sin\phi - \sin\phi_0 \cos\phi \cos(\lambda - \lambda_0)}{\cos c}$$

In some examples, $\lambda_0$ and $\phi_0$ represent the longitude and latitude angles between a line orthogonal to the target projection plane and the optical axis of the camera. In some examples, the orthogonal plane ($\lambda_0$ & $\phi_0$=0) and four radially symmetric planes can be generated to ensure symmetric target placement. In some examples, the calibrated angles of the collimator are projected in combination with the encoder angle from a rotation stage. In some examples, the rotation stage angle can be associated with a ground truth for this projection.

In some examples, the camera testing system can analyze the captured images to identify each projected fiducial marker. For example, the camera testing system can identify the center of fiducial marker (or another part of the fiducial marker that can be specifically identified) and record that position as a target point. The plurality of identified target points can be represented as a grid of points. In some examples, the grid of points generated by identifying the target points for each of a plurality of fiducial markers can be referred to as a reference grid.

Because the reference grid is generated based on the images captured by the camera, the reference grid can include any imperfections or distortions in the image capturing capability of the camera. As can be seen, the reference grid can be distorted such that does not match the ground truth projection. The camera testing system can determine the difference between the ground truth projection and the reference grid to generate calibration data.

As noted above, for the above camera testing system to work, the camera testing system can be calibrated. The calibration of the camera testing system can involve determining the angles of each collimator (e.g., an angle relative to a particular frame, reference, or relative to each other). This calibration of the entire system can be performed even with a camera that has not itself been calibrated.

In a first example, a camera that has already been calibrated can be used in the calibration of the camera testing system. When using an already calibrated camera, the system can estimate the current angles of the collimators based on design data (e.g., from a CAD model) or from previous calibrations of the camera testing system. Using the estimated collimator angles, the camera testing system can generate an expected placement position for each fiducial marker. The collimators can then be used to project the fiducial markers onto a target surface. The camera can be used to capture these projected fiducial markers. If the camera has previously been calibrated, the captured images can be analyzed to determine the actual positions of the fiducial markers as projected and compared to the expected position. Using this comparison, the camera testing system can determine the actual angles of the collimators.

However, if the camera has not previously been calibrated, the camera testing system can use an iterative process to calibrate both the camera and the system simultaneously. Specifically, the process starts with nominal (from CAD) collimator angles. Using the nominal collimator angles, the camera testing service performs the calibration process above. The resulting camera calibration matrix and distortion values can be used to project the fiducial markers into angles in object space which represent the collimator angles. Using these updated collimator angles, the camera testing system can rerun the camera calibration process and repeat until a desired threshold value is reached. For example, the threshold value can be reached when the percent difference of fy and fx (values in the camera calibration matrix) is less than 0.1 percent. In some examples, this process can be repeated on multiple cameras (which are then set aside as calibration cameras) to ensure an anomaly with the camera distortion does not result in inaccurate collimator positions. This can be used, for example, with a camera with a square pixel and lens that is radially symmetric.

The following provides an end-to-end example of the operation of an example system performing the functions described herein for calibrating a camera such as, for example, a camera to be used onboard an autonomous vehicle. An example system for camera rectification by a camera testing system can include a plurality of collimators and a camera. The camera testing system can first calibrate itself, using the method described above.

Once the camera testing system has been calibrated, the camera testing system can project a plurality of fiducial markers on a target surface using the plurality of collimators. In some examples, the plurality of collimators can project fiducial markers such that the fiducial markers are projected to simulate having an infinite focus. In some examples, each fiducial marker in the plurality of fiducial markers can include an identifiable center that represents the position of a fiducial marker. In some examples, the camera can be rotated around its entrance pupil.

Prior to projecting a plurality of fiducial markers on a target surface using the plurality of collimators, the camera testing system can determine a ground truth projection for the plurality of fiducial markers. In some examples, the ground truth projection can use gnomonic projection of the collimator targets onto a virtual plane based on angle data for the plurality of collimators. The ground truth projection can include a plurality of fiducial markers, each projected fiducial marker including or representing a target point.

In some examples, the camera testing system can capture, using the camera, a plurality of images of the target surface. The camera testing system can rotate the camera between each captured image in the plurality of images. In some examples, the camera can have a fixed focal point. A camera with a fixed focal point can be designed such that the focus of the camera cannot be changed. In some examples, the fixed focal point is fixed at an infinite distance.

In some examples, the camera testing system can compare the plurality of images with a ground truth projection. In some examples, comparing the plurality of images with a ground truth projection includes analyzing the plurality of images to determine a plurality of fiducial markers and identify a target point for each fiducial marker. The camera testing system can generate a reference grid using the plurality of determined target points associated with the plurality of fiducial markers. The camera testing system can compare the reference grid with the ground truth projection.

The camera testing system can generate calibration data based on the comparison of the plurality of images with the ground truth projection. Generating calibration data based on the comparison of the plurality of images with the ground truth projection can include determining a degree and direction of distortions between the ground truth projection and the reference grid. The camera testing system can generate calibration data based on the degree and direction of distortions between the ground truth projection and the reference grid.

In some examples, the camera testing system can generate data that is needed to rectify the camera based on the calibration data. In some examples, the camera has initial values in the calibration data before testing and calibrating includes updating those initial values based on the calibration data. In other examples, the calibration for a camera does not include any initial values and then the calibration data is initialized based on the calibration data. In some examples, calibration data includes a camera data matrix and a list of distortion coefficients, as shown below:

$$K = \begin{pmatrix} f_x & 0 & x_0 \\ 0 & f_y & y_0 \\ 0 & 0 & 1 \end{pmatrix}$$

$$Distortion_{coefficients} = (k_1 \quad k_2 \quad p_1 \quad p_2 \quad k_3)$$

This data can be stored for use to rectify images captured by the camera to be calibrated. In some example, the calibration data can be stored in memory associated with the camera itself (e.g., memory onboard the camera). In some examples, the calibration data can be stored by a larger system (e.g., an autonomous vehicle that includes multiple cameras and camera types may centrally store calibration data for all of them).

The systems and methods described herein provide a number of technical effects and benefits. Specifically, the systems and methods of the present disclosure provide an improved system for calibrating cameras with a fixed focal point that is distant from the camera itself (e.g., more than 50 meters). For instance, the process for calibrating a camera involves capturing an image at a known location with known characteristics. For cameras with very far focal points (e.g., a camera that is focused at infinity) the image must usually be calibrated in a large area so that the image can be placed far enough from the camera to capture the detail necessary for calibration. The systems and methods described herein allow the calibration process to be performed without placing the image to be captured relatively far from the camera while calibrating. By reducing the distance needed to calibrate the camera, the camera testing system (and its associated processes) allows cameras to be calibrated with reduced cost, increased accuracy (because reducing the distance needed reduces the number of variables that can reduce accuracy), and reduced time needed to calibrate the camera.

Moreover, the camera testing system allows camera manufacturers to reduce the total amount of space needed to calibrate cameras and reduce the total cost needed to manufacture cameras. As such, the system and processes disclosed herein result in reduced cost, increased accuracy, and improved efficiency.

Some applications, such as autonomous vehicles, can benefit from the improvements to the process for calibrating cameras. For example, an autonomous vehicle can include a system for navigation that includes a plurality of sensors that interact with a perception system that detects object(s) within the vehicle's surrounding environment, a prediction system that predicts the motion of those object(s), and a motion planning system that generates controls for the autonomous vehicle based on the data that is produced by the perception and prediction systems. Thus, improving the system for producing cameras that capture image data for use in a vehicle's perception/prediction/motion planning functions can reduce the cost for producing and maintaining autonomous vehicles while also improving the safety of the autonomous vehicles.

Various means can be configured to perform the methods and processes described herein. For example, a computing system can include projection control unit(s), camera control unit(s), comparison unit(s), calibration data generation unit(s), rectification unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to project a plurality of fiducial markers on a target surface using the plurality of collimators. For example, the plurality of collimators can be adjusted to project the fiducial markers onto a target surface based on a ground truth projection. A projection control unit is one example of a means for projecting a plurality of fiducial markers on a target surface using the plurality of collimators.

The means can be configured to capture, using the camera, a plurality of images of the target surface with the camera, wherein the camera is rotated between each captured image in the plurality of images, and wherein the camera has a fixed focal point. For example, the camera can be aimed at the target surface and activated to capture a plurality of images of the target surface. In some examples, the camera can be rotated between the capture of each image. A camera control unit is one example of a means for capturing, using the camera, a plurality of images of the target surface with the camera, wherein the camera is rotated between each captured image in the plurality of images, and wherein the camera has a fixed focal point.

The means can be configured to compare the plurality of images with a ground truth projection. For example, the plurality of images can be analyzed to determine, for each fiducial marker, a reference point. The plurality reference points can be used to generate a reference grid. The reference grid can be compared to the ground truth projection. A comparison unit is one example of a means for comparing the plurality of images with a ground truth projection.

The means can be configured to generate calibration data based on the comparison of the plurality of images with the ground truth projection. For example, the system can determine the difference between the reference grid and the ground truth projection and based on that difference, generate calibration data that can be used to correct the reference grid to the ground truth projection. A calibration data generation unit is one example of a means for generating calibration data based on the comparison of the plurality of images with the ground truth projection.

The means can be configured to rectify the camera based on the calibration data. For example, the camera testing system can update (or initialize) calibration data for the camera. A calibration unit is one example of a means for rectifying the camera based on the calibration data.

With reference to the figures, example embodiments of the present disclosure will be discussed in further detail.

FIG. 1 depicts a block diagram of an example system 100 for controlling the navigation of a vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 102 including a location (e.g., latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, bike, scooter, other light electric vehicle, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the vehicle 102 in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy system sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy system sensor data 116 can include image data, radar data, LIDAR data, and/or other data acquired by the one or more autonomy system sensors 114. The one or more objects can include, for example, pedestrians, vehicles, bicycles, and/or other objects. The one or more sensors can be located on various parts of the vehicle 102 including a front side, rear side, left side, right side, top, or bottom of the vehicle 102. The autonomy system sensor data 116 can be indicative of locations associated with the one or more objects within the surrounding environment of the vehicle 102 at one or more times. For example, autonomy system sensor data 116 can be indicative of one or more LIDAR point clouds associated with the one or more objects within the surrounding environment. The one or more autonomy system sensors 114 can provide the autonomy system sensor data 116 to the autonomy computing system 120.

In addition to the autonomy system sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy system sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy system sensor data 116 from the one or more autonomy system sensors 114, attempt to determine the state of the surrounding environment by performing various processing techniques on the autonomy system sensor data 116 (and/or other data), and generate an appropriate motion plan through the surrounding environment. The autonomy computing system 120 can control the one or more vehicle control systems 138 to operate the vehicle 102 according to the motion plan. One or more of these systems/computing functions can be included within the same system and/or share one or more computing resources.

The perception system 124 can identify one or more objects that are proximate to the vehicle 102 based on autonomy system sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 102 based at least in part on the prediction data 132 (and/or other data). The motion plan data 134 can include vehicle actions with respect to the objects proximate to the vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., driver's seat, front passenger seat). Additionally, or alternatively, a display device can be viewable by a user of the vehicle 102 that is located in the rear of the vehicle 102 (e.g., a passenger seat in the back of the vehicle).

Figure 2:
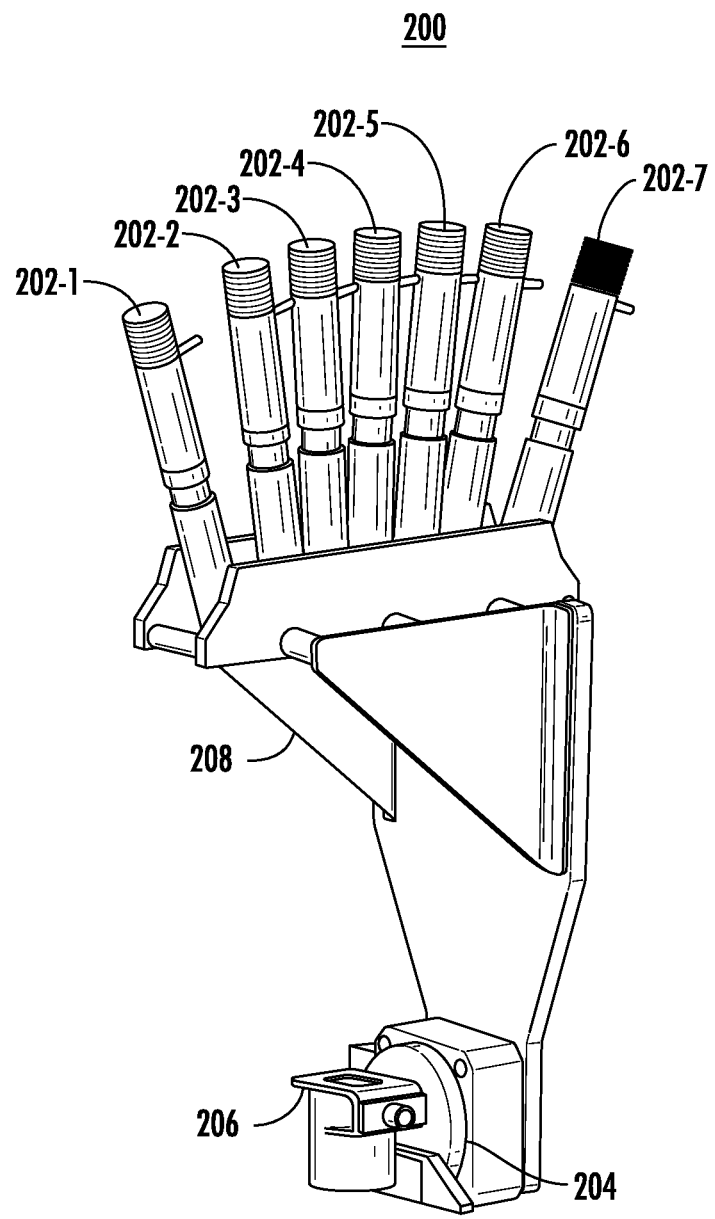
FIG. 2 depicts an example system for calibrating a camera according to example embodiments of the present disclosure.

FIG. 2 depicts an example system for calibrating a camera according to example embodiments of the present disclosure. The example system can be a camera testing device 200 for calibrating a camera. The camera testing device 200 can include a plurality of collimators (202-1 to 202-7), a camera mount 204, a camera 206 to be calibrated, and a chassis 208 that supports the camera mount and the collimators while allowing rotation of the camera mount and adjustment of the angles of the collimators (202-1 to 202-7). In some examples, the collimators (202-1 to 202-7) are configured such that the angle at which the collimators project fiducial markers onto a target surface can be used to mathematically project the locations at which the markers will appear by a control system (not pictured) associated with the camera testing device 200. In some examples, the camera testing device 200 can include seven collimators (202-1 to 202-7). Alternatively, the camera testing device 200 can include a variable number of collimators depending on the specific cameras to be tested and the size of the camera testing device 200.

In some examples, the camera testing device 200 includes a camera mount 204 for holding the camera 206 to be tested. The camera mount 204 can be configured such that the camera 206 can be rotated around its entrance pupil. In this way, when the camera 206 is rotated, the input position remains in constant location. Thus, when the camera testing device 200 causes the camera 206 to capture a plurality of images of a target surface, the plurality of images can have the same center position regardless of the rotation of the camera 206. In some examples, having a common center point will allow the camera testing device 200 to analyze the images more effectively and extract information from them that is more reliable.

Figure 3:
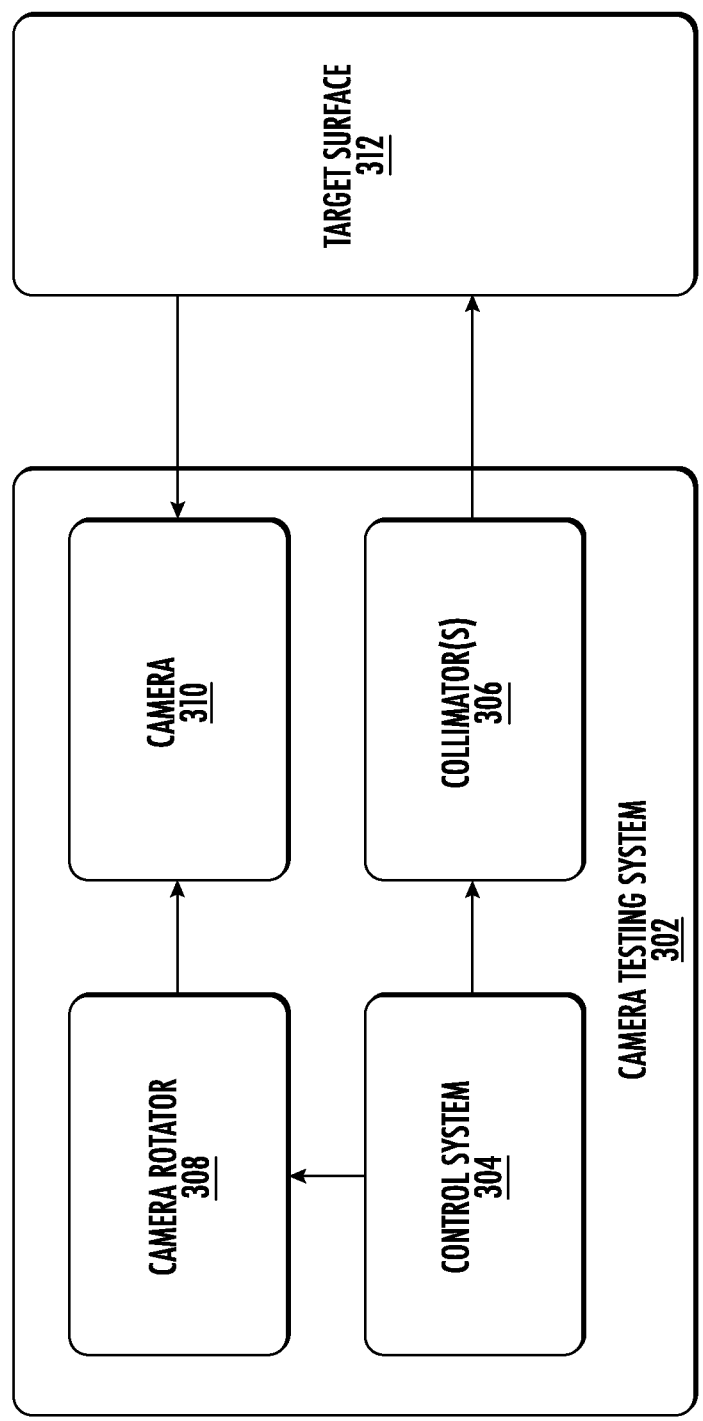
FIG. 3 depicts a block diagram for a camera testing system according to example embodiments of the present disclosure.

FIG. 3 depicts a block diagram for a camera testing system 302 according to example embodiments of the present disclosure. In some examples, the camera testing system 302 can include a control system 304, one or more collimators 306, a camera rotator 308, and a camera 310. The control system 304 can be implemented as a computing device that includes one or more processors and memory. The memory can store instructions that, when executed by one or more computing devices, cause the control system 304 to perform operations.

For example, the control system 304 can calibrate the camera testing system 302 such that the position of the collimators can be determined. The determine or access a previously determined ground truth projection. The control system 304 can determine the current position, orientation, and angle of each collimator 306 and use that data to gnomonically project the fiducial markers onto a virtual plane and generate a ground truth projection. A ground truth projection can include data that represents a predetermined (or fixed) layout of fiducial markers on a target surface.

In some examples, the control system 304 can, using actuators or other devices designed for the purpose, change the position, orientation, and angle of the one or more collimators 306 such that they are positioned to project the plurality of fiducial markers to specific positions on the target surface 312. The control system 304 can compare images captured by the camera 310 to the ground truth projection. The comparison of captured images can allow the control system 304 to determine whether each particular camera that is tested is capturing a distorted view of the target surface.

In some examples, the control system 304 can also control the camera 310 to be tested. Specifically, the control system 304 can determine the number of images to be captured and the degree of rotation between capturing each image. Once the control system 304 determines, based on known collimator angles, a ground truth projection for the projected fiducial markers, the control system 304 can cause the collimators 306 to begin projecting a plurality of fiducial markers, each fiducial marker associated with one or more target points.

The fiducial markers can be projected onto a target surface 312. In some examples, the target surface 312 can be a surface associated with the camera testing system 302. For example, the target surface 312 can be a screen (or similar surface) physically attached to the camera testing system 302 (e.g., connected to the chassis) such that it remains at a fixed distance from the camera 310. In this way, the camera testing system 302 can know the position, layout, and composition of the target surface. In some examples, the target surface 312 is a permanent feature of the area in which camera testing system 302 is placed (e.g., such as a screen attached to a wall or other location that is suitable to have an image projected onto it).

In some examples, the fiducial markers are projected onto the target surface 312 by the collimators 306 such that they simulate an image at an infinite distance. This is accomplished by the collimators 306 which can modify the projected light rays such that they are parallel to each other. Parallel light rays, when reflected back to the camera off of the target surface, can simulate light reflecting off an object at an infinite distance towards the camera 310. In some examples, the camera 310 can have a fixed focal point that is focused on infinity. Thus, when the camera 310 captures the projected marker (which has been projected with parallel light rays), the camera 310 (which has a focus fixed at infinity) can focus clearly enough to distinguish the necessary features of the projected fiducial marker.

Once the camera 310 has captured a plurality of images of the target surface 312, the control system 304 can compare the captured image data to the ground truth projection. Once the captured image data is compared to the ground truth projection, the control system 304 can generate calibration data. In some examples, calibration data can represent data measuring distortions present between the captured image data and the ground truth projection. In some examples, the calibration data can represent specific data that can allow the camera to make one or more adjustments to images captured by the camera 310 to correct the identified distortions in future captured images.

The control system 304 can use the generated calibration data to rectify the camera 310. In some examples, rectifying the camera can include initializing camera calibration data (e.g., when the calibration data did not have any initial default values). For example, the calibration data can be used to identify values for a camera data matrix and a list of distortion coefficients that will be used by a camera to remove any detected distortions. The control system 304 or other system can access memory in the camera that stores the camera data matrix and the list of distortion coefficients and set the corresponding memory locations to the identified values. In this example, the memory locations, before this initialization, may contain random values that result when the memory was initially powered up or something else such as a NULL value.

Alternatively, rectifying the camera 310 can include updating calibration data associated with the camera 310 (e.g., wherein the calibration data has default values initially). Thus, in some examples, the camera data matrix and a list of distortion coefficients of each camera can be initially set to default values. Once the calibration data has been generated for a particular camera, the control system 304 can update these calibration data values to the determined values.

Figure 4:
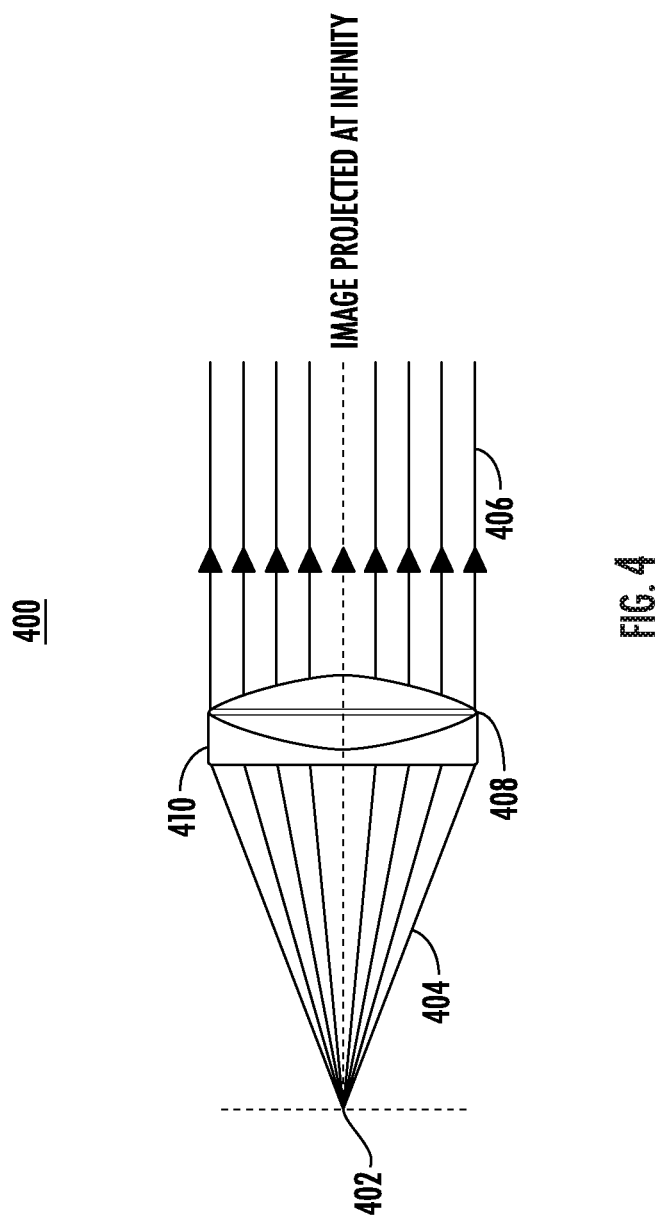
FIG. 4 depicts an example collimator according to example embodiments of the present disclosure.

FIG. 4 depicts an example collimator 400 according to example embodiments of the present disclosure. In some examples, the collimator 400 can be used to project fiducial markers that simulate an image or object being viewed from an infinite distance. To achieve this task, the collimator 400 can include a light source 402, an aperture 410, and a positive lens 408. A positive lens 408 can be a lens that is thicker at its center and thinner towards its outer portions. For example, as seen in this example, the positive lens 408 can have two sides that are both curved in a convex pattern. Thus, the light source 402 can project light through lens 408 which then passes through the aperture. The light source 402 can also either modify or originate light such that the fiducial marker is projected.

As noted above, the collimator 400 can act to change the path of light rays passing through the positive lens such that the rays of light originating from a light source with a path in which the light rays spread out from each other (404) and are then altered by the positive lens 408 such that the path of the light rays becomes parallel to each other (406). In this way, the collimator 400 can simulate an object at infinite distance.

Figure 5:
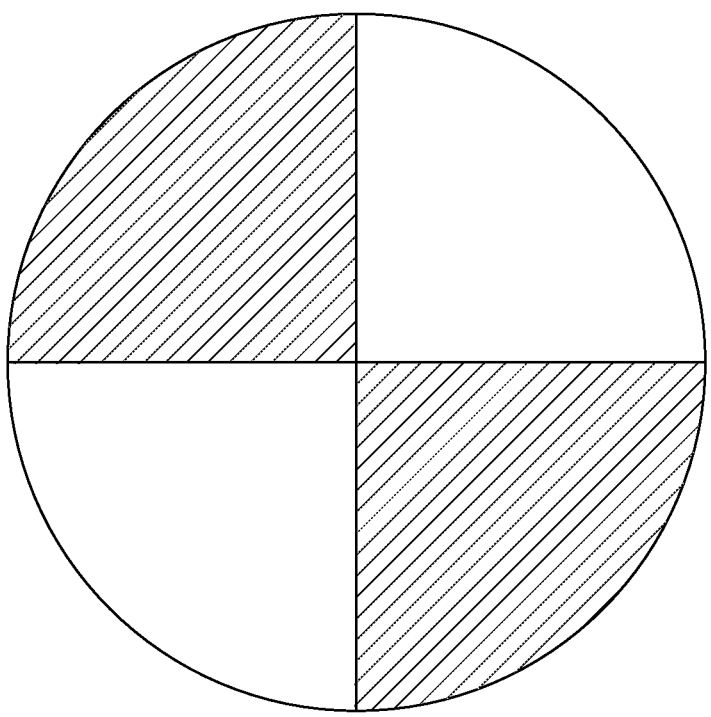
FIG. 5 depicts an example fiducial marker according to example embodiments of the present disclosure.

FIG. 5 depicts an example fiducial marker 500 according to example embodiments of the present disclosure. The fiducial marker 500 can be an image that is configured such that it is possible to quickly and efficiently determine the center of the fiducial marker. In this particular example, the fiducial marker 500 can be a circular target that is composed of two colors arranged such that the center can be determined by analyzing one or more captured images. In some examples, the fiducial markers 500 can include any other pattern that can be analyzed to determine one or more reference points.

Figure 6:
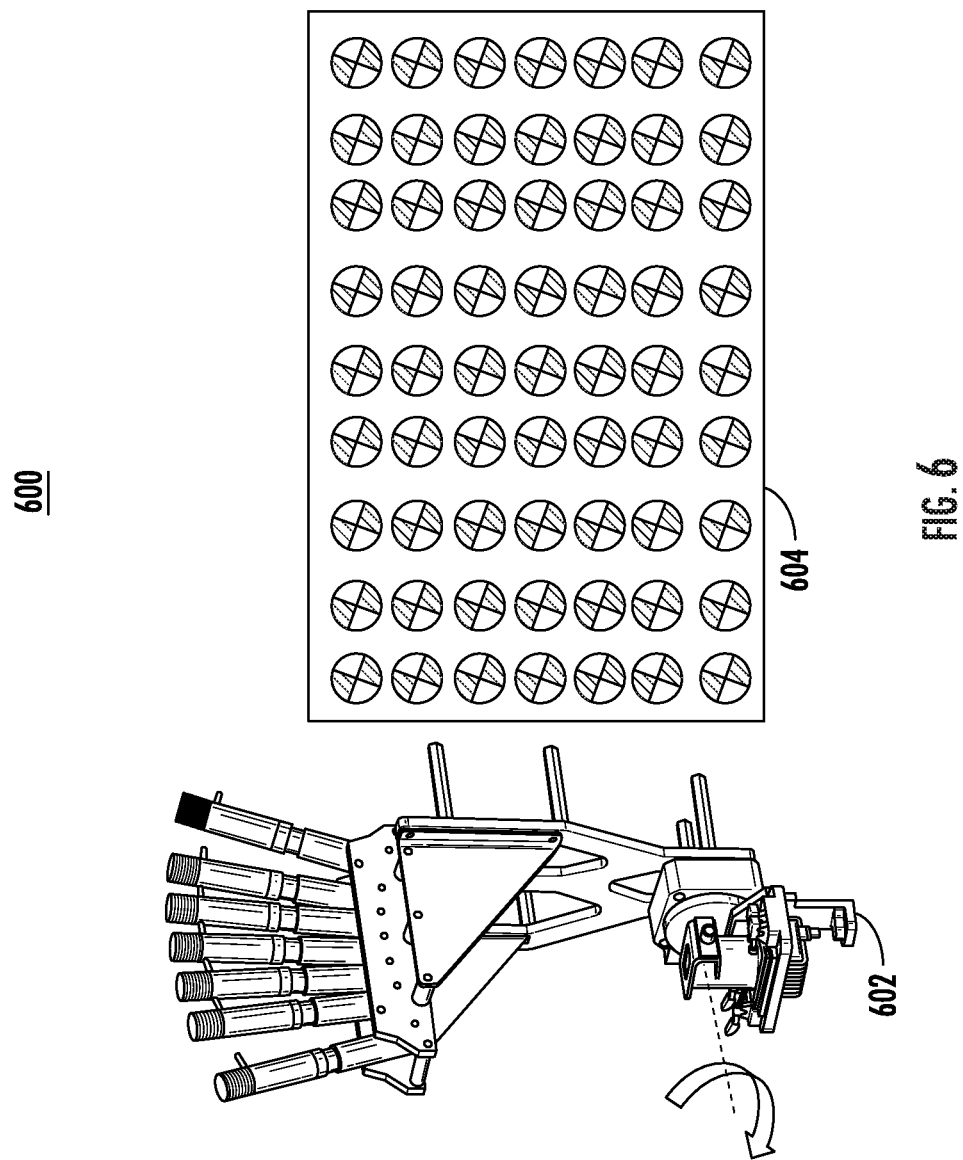
FIG. 6 depicts an example projected ground truth projection according to example embodiments of the present disclosure.

FIG. 6 depicts an example projected fiducial marker grid 600 according to example embodiments of the present disclosure. In some examples, the camera testing system 602 can project a series of fiducial markers on the target surface such that the fiducial markers form a grid pattern 604. As noted above, the pattern 604 can be based on an existing ground truth projection. The pattern can be a series of fiducial markers arranged in one or more rows (e.g., 7 rows) and one or more columns (e.g., 9 columns). The fiducial markers can be projected by the camera testing system 602 such that all fiducial markers are projected simultaneously. The fiducial markers can also be projected sequentially such that the grid of fiducial markers is only partially visible at any given time and the camera is controlled to capture each fiducial marker at each point in the grid pattern 604.

Figure 7:
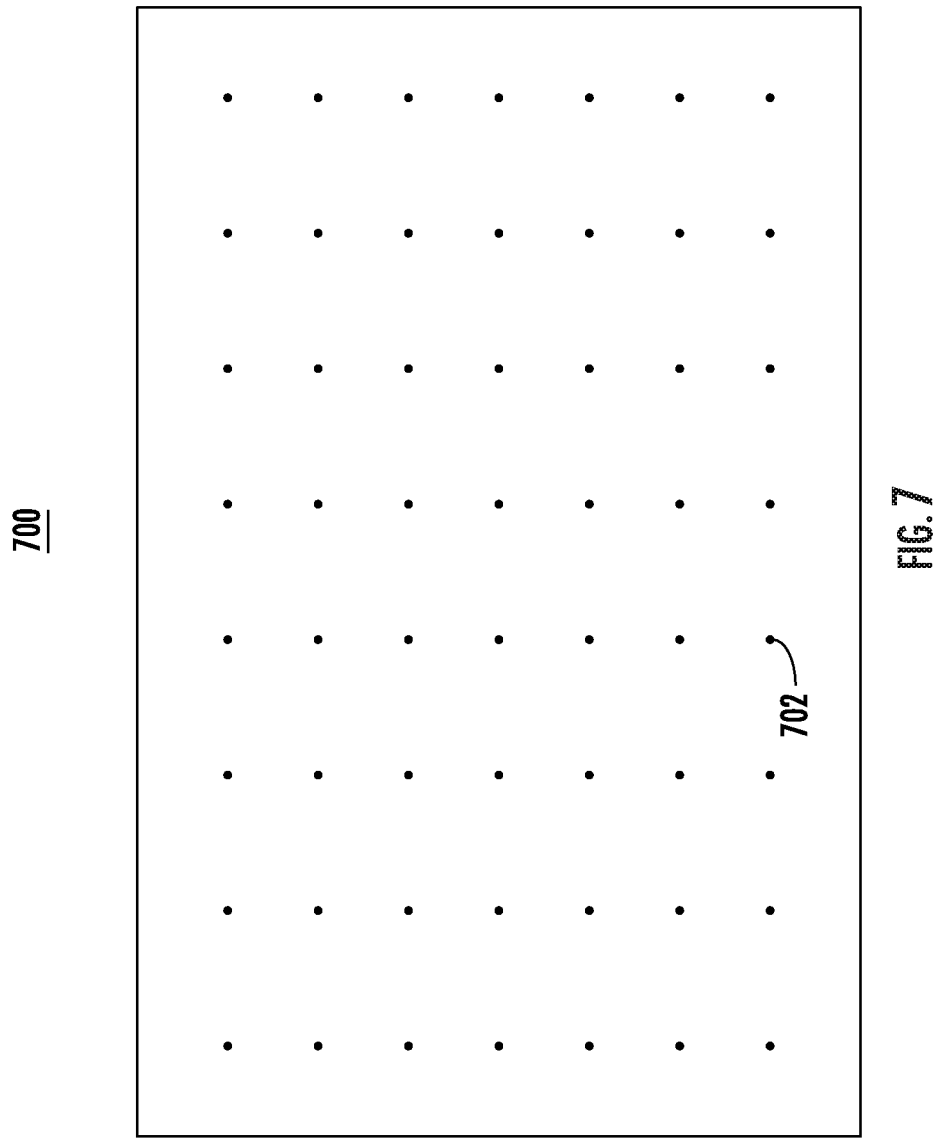
FIG. 7 depicts an example ground truth projection according to example embodiments of the present disclosure.

FIG. 7 depicts an example ground truth projection 700 according to example embodiments of the present disclosure. The ground truth projection can include a plurality of fiducial markers (e.g., 702) arranged in a particular pattern. The ground truth projection 700 can be generated based on a mathematical projection of the markers onto a virtual plane based on known collimator angle information. In some examples, as part of a calibration of the camera testing system, the camera testing system (e.g., camera testing system 302 in FIG. 3) can calculate the correct angles for the plurality of collimators (e.g., collimators 306 in FIG. 3) based on the ground truth projection 700 as well as any information about the target surface. Relevant data about the target surface can include the distance of the target surface, the angle of the target surface relative to the collimators and the camera, and the composition of the target surface.

Figure 8:
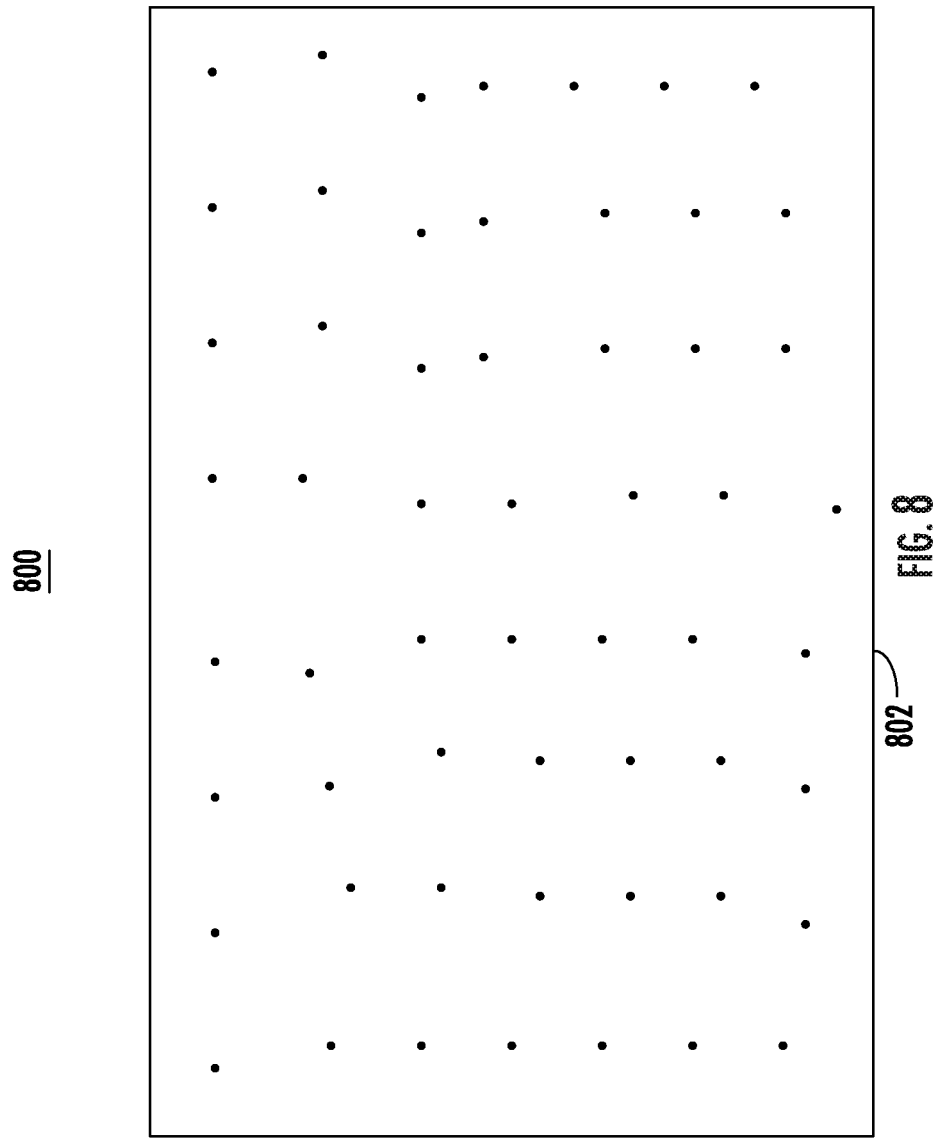
FIG. 8 depicts an example reference grid according to example embodiments of the present disclosure.

FIG. 8 depicts an example reference grid 800 according to example embodiments of the present disclosure. The camera testing system (e.g., camera testing system 302 in FIG. 3) can analyze the captured images to identify each projected fiducial marker. Once each projected fiducial marker is identified, the camera testing system (e.g., camera testing system 302 in FIG. 3) can identify a central point of each fiducial marker. The plurality of identified centers can be represented as a grid of points 802. In some examples, the grid of points 802 (e.g., generated by identifying the center of each fiducial marker) can be referred to as a reference grid 800.

Because the reference grid 800 is generated based on the images captured by the camera (e.g., camera 310 in FIG. 3), the reference grid 800 can include any imperfections or distortions in the image capturing capability of the camera. As can be seen, the reference grid 800 can be distorted from the ground truth projection. The camera testing system (e.g., camera testing system 302 in FIG. 3) can determine the difference between the ground truth projection (e.g., ground truth projection 700 in FIG. 7) and the reference grid 800 to generate calibration data. In this case, calibration data can represent data representing how the captured image needs to be altered to reflect the actual layout of the fiducial markers as represented by the ground truth projection (e.g., ground truth projection 700 in FIG. 7).

Figure 9:
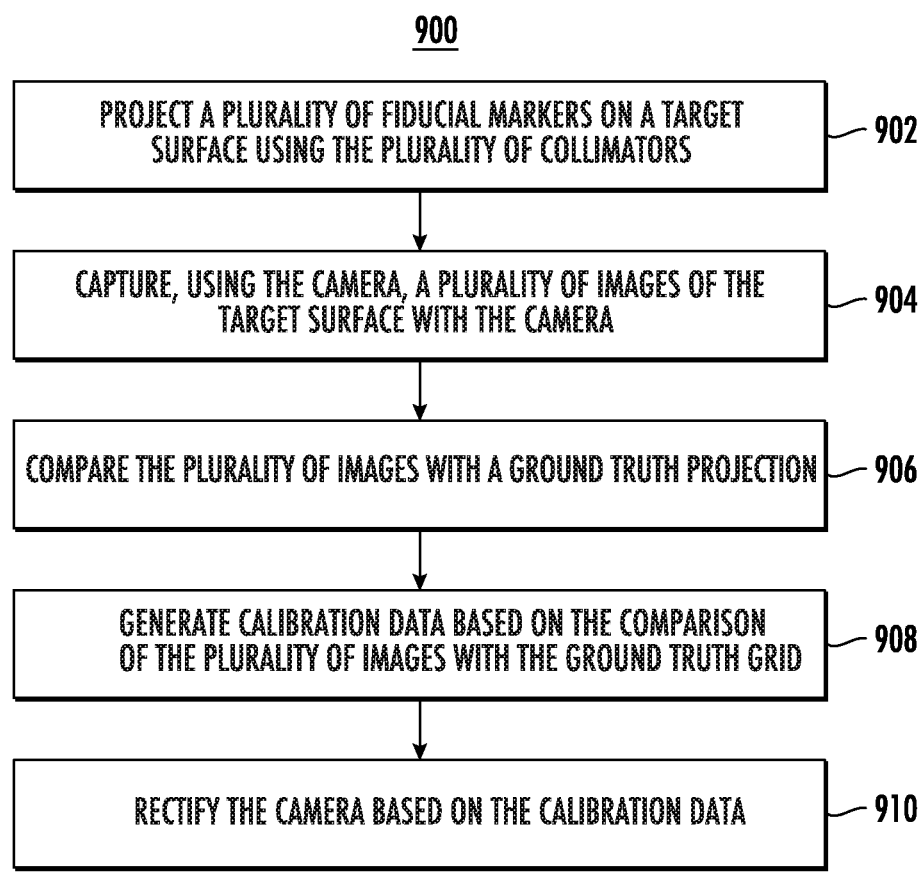
FIG. 9 depicts an example flow chart according to example embodiments of the present disclosure.

FIG. 9 depicts an example flow chart according to an example embodiment of the present disclosure. One or more portions of method 900 can be implemented by one or more computing devices such as, for example, a computing device of camera testing system 302 as depicted in FIG. 3, and/or computing device 1104 depicted in FIG. 11. One or more portions of the method 900 described herein can be implemented as an algorithm on the hardware components of the devices described herein (e.g., as in FIG. 3 or FIG. 11) to, for example, to generate calibration data and/or rectify cameras. Although FIG. 9 depicts steps performed in a particular order for purposes of illustration and discussion, method 900 of FIG. 9 is not limited to the particularly illustrated order or arrangement. The various steps of the methods disclosed herein can be omitted, rearranged, combined, and/or adapted in various ways without deviating from the scope of the present disclosure.

A camera testing system (e.g., camera testing system 302 in FIG. 3) comprising a plurality of collimators and a camera, can project, at 902, a plurality of fiducial markers on a target surface using the plurality of collimators. The plurality of collimators can project the fiducial markers such that the fiducial markers have an infinite focus. The fiducial markers can have an infinite focus (or simulate having an infinite focus) because each collimator in the plurality of collimators includes a positive lens that adjusts light rays passing through it such that the light rays travel on a path that is parallel to each other. Light rays received or captured by a camera can be captured at angles increasingly close to parallel as the object from which they originate (or reflect off of) is further away. Thus, by adjusting the path of the light rays such that they travel in parallel to each other, the collimators can project fiducial markers that simulate an image that is an infinite distance away.

The fiducial markers can be any images that can be analyzed to determine a grid of points with a high level of accuracy. In one example, a fiducial marker is a circular target comprising two colors that divide the circle into four equal-sized quadrants, each quadrant having one of the two colors in an alternating fashion. In addition, no quadrant touches another quadrant of the same color, except at the very center, where all four quadrants touch. The contrast between the two colors can allow a computing system to identify the central point of the circular target with a high degree of accuracy. Thus, the fiducial markers can have a discoverable center.

The camera testing system (e.g., camera testing system 302 in FIG. 3) can, as part of the process of projecting a plurality of fiducial markers on a target surface using the plurality of collimators, determine a ground truth projection for the plurality of fiducial markers. A ground truth projection can include a plurality of object points, each object point representing a center of a projected fiducial marker.

In some examples, determining a ground truth projection includes, determining, current angle data for the plurality of collimators. The current angle data for the plurality of collimators can describe the current angles at which the collimators project the fiducial markers, relative to a particular reference point, relative to each other, or relative to a particular surface (virtual or real). The camera testing system can generate the ground truth projection by mathematically projecting a plurality of fiduciary markers onto a virtual surface using the current angle data for the plurality of collimators. The ground truth projection can describe a location of a plurality of fiducial markers on a virtual surface, each fiducial marker being associated with one or more target points.

The camera testing system (e.g., camera testing system 302 in FIG. 3) can capture, at 904, using a camera, a plurality of images of the target surface with the camera. The camera can be rotated between each instance in which an image in the plurality of images is captured. The camera can have a fixed focal point. In some examples, the fixed focal point can be fixed at an infinite distance. A focal point can represent a distance from the camera from which details of a target are most easily captured. Thus, a camera that has a focal point fixed at an infinite distance can be best able to focus on objects or images that are an infinite distance away. In some examples, the camera can be rotated around its entrance pupil. Thus, the center of the camera (and the images it captures) can remain constant even though the camera is rotated.

The camera testing system (e.g., camera testing system 302 in FIG. 3) can compare, at 906, data captured with the plurality of images to the ground truth projection. In some examples, as part of comparing data gathered from the plurality of images with the ground truth projection, the camera testing system (e.g., camera testing system 302 in FIG. 3) can analyze the plurality of images to determine a center point for each fiducial marker. The camera testing system (e.g., camera testing system 302 in FIG. 3) can generate a reference grid using a plurality of center points for a plurality of fiducial markers.

The camera testing system (e.g., camera testing system 302 in FIG. 3) can compare the reference grid with the ground truth projection. The camera testing system (e.g., camera testing system 302 in FIG. 3) can determine a degree and direction of distortions between the ground truth projection and the reference grid.

The camera testing system (e.g., camera testing system 302 in FIG. 3) can generate, at 908, calibration data based on the comparison of the plurality of images with the ground truth projection. In some examples, the camera testing system (e.g., camera testing system 302 in FIG. 3) can generate calibration data based on the degree and direction of distortions between the ground truth projection and the reference grid. The camera testing system (e.g., camera testing system 302 in FIG. 3) can rectify, at 910, the camera based on the calibration data.

In some examples, rectifying the camera can include updating, by the camera testing system, calibration data for the camera based on the determined calibration data. For example, the camera may have some default data values that can be updated based on the determined calibration data. In other examples, rectifying the camera can include initializing calibration data for the camera based on the determined calibration data. In some examples, the calibration data can include a camera data matrix and a list of distortion coefficients.

Figure 10:
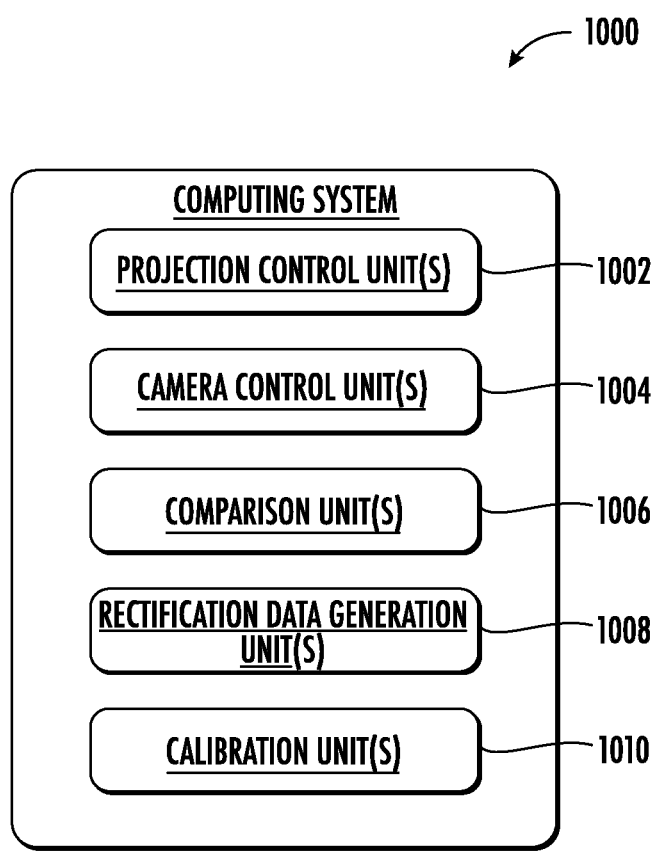
FIG. 10 depicts an example system with units for performing operations and functions according to example aspects of the present disclosure.

FIG. 10 depicts an example system 1000 with units for performing operations and functions according to example aspects of the present disclosure. Various means can be configured to perform the methods and processes described herein. For example, a computing system can include projection control unit(s) 1002, camera control unit(s) 1004, comparison unit(s) 1006, calibration data generation unit(s) 1008, calibration unit(s) 1010, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to project a plurality of fiducial markers on a target surface using the plurality of collimators. For example, the plurality of collimators can be adjusted to project the fiducial markers onto a target surface based on a ground truth projection. A projection control unit 1002 is one example of a means for projecting a plurality of fiducial markers on a target surface using the plurality of collimators.

The means can be configured to capture, using the camera, a plurality of images of the target surface with the camera, wherein the camera is rotated between each captured image in the plurality of images, and wherein the camera has a fixed focal point. For example, the camera can be aimed at the target surface and activated to capture a plurality of images of the target surface. In some examples, the camera can be rotated between the capture of each image. A camera control unit 1004 is one example of a means for capturing, using the camera, a plurality of images of the target surface with the camera, wherein the camera is rotated between each captured image in the plurality of images, and wherein the camera has a fixed focal point.

The means can be configured to compare the plurality of images with a ground truth projection. For example, the plurality of images can be analyzed to determine, for each fiducial marker, a reference point. The plurality reference points can be used to generate a reference grid. The reference grid can be compared to the ground truth projection. A comparison unit 1006 is one example of a means for comparing the plurality of images with a ground truth projection.

The means can be configured to generate calibration data based on the comparison of the plurality of images with the ground truth projection. For example, the system can determine the difference between the reference grid and the ground truth projection and based on that difference, generate calibration data that can be used to correct the reference grid to the ground truth projection. A calibration data generation unit 1008 is one example of a means for generating calibration data based on the comparison of the plurality of images with the ground truth projection.

The means can be configured to calibrate the camera based on the calibration data. For example, the camera testing system can update (or initialize) calibration data for the camera. A calibration unit 1010 is one example of a means for calibrating the camera based on the calibration data.

Figure 11:
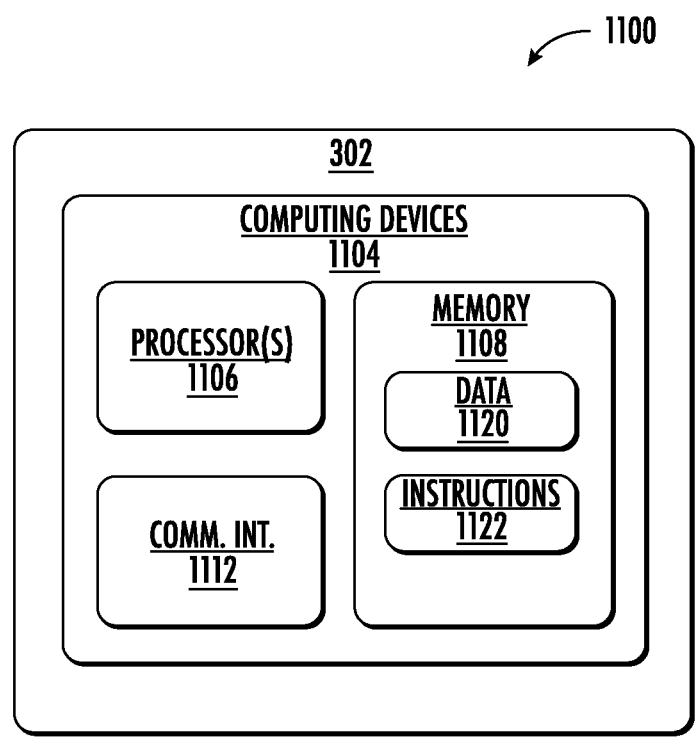
FIG. 11 depicts example system components according to example aspects of the present disclosure.

FIG. 11 depicts a block diagram of an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. As one example, the example system 1100 can include the camera testing system 302 of FIG. 3 that can be communicatively coupled to one another over one or more network(s).

The computing device(s) 1104 of the camera testing system 302 can include processor(s) 1106 and at least one memory 1108. The one or more processors 1106 can be any suitable processing device (e.g., a processor core, a microprocessor, an ASIC, a FPGA, a controller, a microcontroller, etc.) and can be one processor or a plurality of processors that are operatively connected. The memory 1108 can include one or more non-transitory computer-readable storage media, such as RAM, ROM, EEPROM, EPROM, one or more memory devices, flash memory devices, magnetic disks, data registers, etc., and combinations thereof.

The memory 1108 can store information that can be accessed by the one or more processors 1106. For instance, the memory 1108 (e.g., one or more non-transitory computer-readable storage mediums, memory devices) can include computer-readable instructions 1122 that can be executed by the one or more processors 1106. The instructions 1122 can be software written in any suitable programming language or can be implemented in hardware. Additionally, or alternatively, the instructions 1122 can be executed in logically and/or virtually separate threads on processor(s) 1106.

For example, the memory 1108 on-board the camera testing system 302 can store instructions 1122 that when executed by the one or more processors 1106 cause the one or more processors 1106 (e.g., in the camera testing system 302) to perform operations such as any of the operations and functions of the computing device(s) 1104 and/or camera testing system 302, any of the operations and functions for which the camera testing system 302 is configured, and/or any other operations and functions described herein.

The memory 1108 can store data that can be obtained (e.g., received, accessed, written, manipulated, created, generated, etc.) and/or stored. The data 1120 can include, for instance, ground truth data, camera data, calibration data, and/or other data/information as described herein. In some implementations, the computing device(s) 1104 can obtain data from one or more memories that are remote from the camera testing system 302.

The camera testing system 302 can also include a communication interface 1112 used to communicate with one or more other system(s). The communication interface 1112 can include any circuits, components, software, etc. for communicating via one or more networks. In some implementations, the communication interface 1112 can include, for example, one or more of a communications controller, receiver, transceiver, transmitter, port, conductors, software, and/or hardware for communicating data.

Computing tasks discussed herein as being performed at the camera testing system 302 can instead be performed at a computer system remote from the camera testing system 302, or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Figure 12:
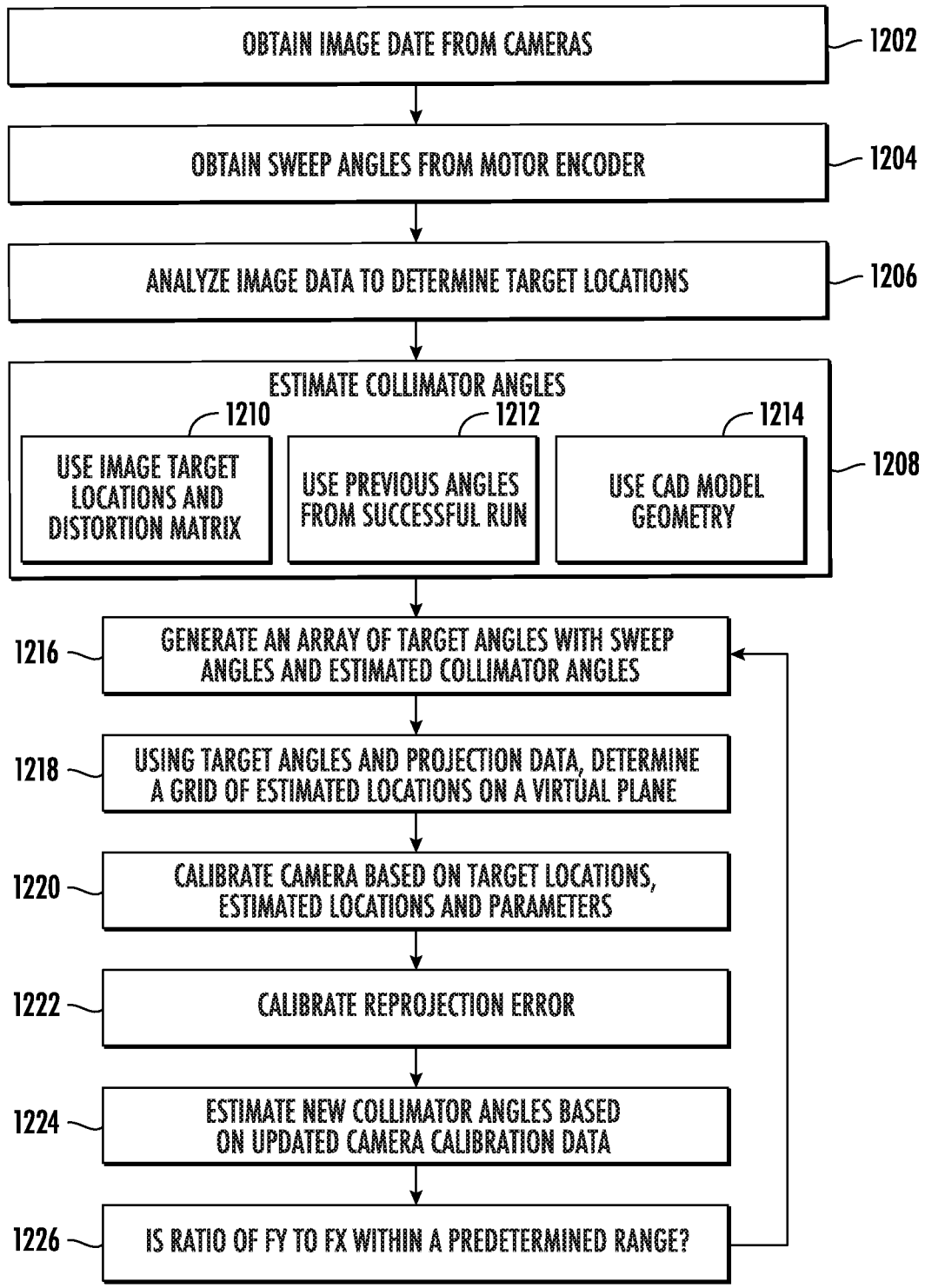
FIG. 12 depicts an example flow chart according to example embodiments of the present disclosure.

FIG. 12 depicts an example flow chart according to example embodiments of the present disclosure. One or more portions of method 1200 can be implemented by one or more computing devices such as, for example, a computing device of camera testing system 302 as depicted in FIG. 3, and/or computing device(s) 1104 depicted in FIG. 11. One or more portions of the method 1200 described herein can be implemented as an algorithm on the hardware components of the devices described herein (e.g., as in FIG. 3 or FIG. 11) to, for example, to generate calibration data for a camera testing system itself. Although FIG. 12 depicts steps performed in a particular order for purposes of illustration and discussion, method 1200 of FIG. 12 is not limited to the particularly illustrated order or arrangement. The various steps of the methods disclosed herein can be omitted, rearranged, combined, and/or adapted in various ways without deviating from the scope of the present disclosure.

A camera testing system (e.g., camera testing system 302 in FIG. 3) or a system for calibrating the camera testing system itself can obtain, at 1202, from one or more cameras, image data captured of a target surface. In some examples, the target surface can have one or more images projected onto it by a plurality of collimators.

The camera testing system (e.g., camera testing system 302 in FIG. 3) can access, at 1204, sweep angles from the control system (e.g., control system 304 in FIG. 3) or from an image file name accessible via the motor encoder. The sweep angles can represent one or more movements for the camera capturing image data under the control of the motor encoder.

The camera testing system (e.g., camera testing system 302 in FIG. 3) can, at 1206, analyze the image data to determine a plurality of fiducial markers (e.g., image points). As noted above, the camera testing system (e.g., camera testing system 302 in FIG. 3) can analyze the image data to determine the center of a plurality of fiducial markers in the image data. The center of the plurality of fiducial markers can be used as the target point.

The camera testing system (e.g., camera testing system 302 in FIG. 3) can, at 1208, estimate the current collimator angles. To do so, the camera testing system (e.g., camera testing system 302 in FIG. 3) can use, at 1210, image target locations and a distortion matrix to estimate the current collimator angles. In some examples, the camera testing system can use a plurality of different methods for estimating the current collimator angles, depending on the situation and what other data is examples. For example, if the camera testing system is being calibrated using an already calibrated camera, the camera testing system can analyze data captured by the calibrated camera to determine the current collimator angles by comparing an expected ground truth projection to the captured image data (once it has been corrected by calibration data for the camera).

If the camera currently being used is not already calibrated, the camera testing system (e.g., camera testing system 302) can use angles previously known from successful runs 1212 if that data is available. Alternatively, the camera testing system (e.g., camera testing system 302 in FIG. 3) can use or CAD model geometry data 1214 to estimate the current collimator angles. Thus, the camera testing system can use one of the above methods to estimate the current collimator angles or a combination of these methods.

The camera testing system (e.g., camera testing system 302 in FIG. 3) can, at 1216, generate an array of target angles, wherein the array includes both sweep angles (the travel path of a collimator) and the estimated collimator angles.

Using the array of target angles and the projection data, the camera testing system (e.g., camera testing system 302 in FIG. 3) can, at 1218, generate a grid of estimated locations. The grid of estimated locations can represent the locations that the fiducial markers are expected to be identified.

The camera testing system (e.g., camera testing system 302 in FIG. 3) can, at 1220, calibrate the camera based on the target locations, estimated locations, and nominal intrinsic parameters of the camera. The camera testing system (e.g., camera testing system 302 in FIG. 3) can, at 1222, calculate a reprojection error. The camera testing system (e.g., camera testing system 302 in FIG. 3) can, at 1224, estimate new collimator angles based on distortion and camera matrices of the newly calibrated camera. The camera testing system (e.g., camera testing system 302 in FIG. 3) can determine a ratio of fy to fx. This ratio can be compared to a predetermined calibration value. For example, the camera testing system can determine if fy/fx is less than 0.01 percent. If the value is above a predetermined threshold, the camera testing system (e.g., camera testing system 302 in FIG. 3) can, at 1226, repeat the process from the generation of the array at 1216.

In some examples, the camera testing system (e.g., camera testing system 302 in FIG. 3) can perform this process with a plurality of cameras to minimize the effect that a single camera's distortions has on the process of accurately determining or calibrating the collimator positions.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for camera rectification by a camera testing system comprising a plurality of collimators and a camera, the method comprising:
    projecting, by the camera testing system, a plurality of fiducial markers on a target surface using the plurality of collimators;
    capturing, by the camera testing system and using the camera, a plurality of images of the target surface with the camera, wherein the camera is rotated between each captured image in the plurality of images;
    comparing, by the camera testing system, the plurality of images with a ground truth projection;
    generating, by the camera testing system, calibration data based on the comparison of the plurality of images with the ground truth projection; and
    storing, by the camera testing system, the calibration data for use in rectifying the camera.

2. The computer-implemented method of claim 1, wherein a fiducial marker is a circular target image.

3. The computer-implemented method of claim 2, wherein the fiducial marker includes a discoverable center point.

4. The computer-implemented method of claim 2, wherein the calibration data includes a camera data matrix and a list of distortion coefficients.

5. The computer-implemented method of claim 1, wherein the plurality of collimators project the plurality of fiducial markers such that the fiducial markers have an infinite focus.

6. The computer-implemented method of claim 1, wherein the camera has a fixed focal point.

7. The computer-implemented method of claim 6, wherein the fixed focal point is fixed at an infinite distance.

8. The computer-implemented method of claim 1, wherein projecting a plurality of fiducial markers on a target surface using the plurality of collimators further comprises:
    determining, by the camera testing system, current angle data for the plurality of collimators; and
    generating, by the camera testing system, a ground truth projection by mathematically projecting a plurality of fiduciary markers onto a virtual surface using the current angle data for the plurality of collimators.

9. The computer-implemented method of claim 8, wherein the ground truth projection describes a location of a plurality of fiducial markers on a virtual surface, each fiducial marker being associated with one or more target points.

10. The computer-implemented method of claim 1, wherein comparing the plurality of images with the ground truth projection further comprises:
    analyzing, by the camera testing system, the plurality of images to determine a plurality of fiducial markers within the images; and
    generating, by the camera testing system, a reference grid using the plurality of fiducial markers.

11. The computer-implemented method of claim 10, wherein determining a plurality of fiducial markers further comprises:
    identifying, by the camera testing system, one or more fiducial markers in the captured images;
    for each identified fiducial marker, identifying, by the camera testing system, a center of the fiducial marker as a target point.

12. The computer-implemented method of claim 11, wherein comparing the plurality of images with the ground truth projection further comprises:
    comparing, by the camera testing system, the reference grid with the ground truth projection.

13. The computer-implemented method of claim 12, wherein generating calibration data based on the comparison of the plurality of images with the ground truth projection further comprises:
    determining, by the camera testing system, a degree and direction of distortions between the ground truth projection and the reference grid; and
    generating, by the camera testing system, calibration data based on the degree and direction of distortions between the ground truth projection and the reference grid.

14. The computer-implemented method of claim 1, wherein the camera is rotated around its entrance pupil.

15. A camera testing system comprising:
    a plurality of collimators configured to project a plurality of fiducial markers on a target surface;
    a camera with a fixed focal point configured to capture images of the target surface; and
    a testing control system configured to:
        rotate the camera while capturing a plurality of images of the target surface;
        compare the plurality of images with a ground truth projection;
        generate calibration data based on the comparison of the plurality of images with the ground truth projection; and
        store the calibration data for use in rectifying the camera.

16. The camera testing system of claim 15, wherein the testing control system is further configured to:
    generate a ground truth projection, wherein generation of the ground truth projection comprises:
        determining current angle data for the plurality of collimators; and
        generating a ground truth projection by mathematically projecting a plurality of fiduciary markers onto a virtual surface using the current angle data for the plurality of collimators.

17. The camera testing system of claim 16, wherein the ground truth projection describes a location of a plurality of fiducial markers on a virtual surface, each fiducial marker being associated with one or more target points.

18. The camera testing system of claim 15, wherein the plurality of collimators project fiducial markers such that the fiducial markers are focused on infinity.

19. A camera testing device, the device comprising:
a plurality of collimators configured to project a plurality of fiducial markers on a target surface;
a camera with a fixed focal point configured to capture a plurality of images of the target surface from a plurality of rotation angles; and
a control system, the control system comprising processors and memory, the memory storing instructions that, when executed by one or more computing devices, cause the control system to perform operations, the operations comprising:
rotating the camera while capturing a plurality of images of the target surface;
comparing the plurality of images with a ground truth projection;
generating calibration data based on the comparison of the plurality of images with the ground truth projection; and
rectifying the camera based on the calibration data.

20. The camera testing device of claim 19, wherein the plurality of collimators project the plurality of fiducial markers such that the fiducial markers have an infinite focus.

* * * * *